United States Patent
Huignard et al.

(10) Patent No.: US 6,834,061 B2
(45) Date of Patent: Dec. 21, 2004

(54) POWER FIBER LASER WITH MODE CONVERSION

(75) Inventors: Jean-Pierre Huignard, Paris (FR); Arnaud Brignon, Bourg la Reine (FR)

(73) Assignee: Thales, Paris (FR)

( * ) Notice: Subject to any disclaimer, the term of this patent is extended or adjusted under 35 U.S.C. 154(b) by 0 days.

(21) Appl. No.: 10/069,533

(22) PCT Filed: Jul. 6, 2001

(86) PCT No.: PCT/FR01/02188
§ 371 (c)(1),
(2), (4) Date: Mar. 6, 2002

(87) PCT Pub. No.: WO02/05394
PCT Pub. Date: Jan. 17, 2002

(65) Prior Publication Data
US 2004/0233940 A1 Nov. 25, 2004

(30) Foreign Application Priority Data
Jul. 7, 2000 (FR) .............................. 00 08918

(51) Int. Cl.$^7$ ................................. H01S 3/30
(52) U.S. Cl. ............................. 372/6; 372/19
(58) Field of Search ............. 372/6, 5, 19, 21; 359/1, 341

(56) References Cited

U.S. PATENT DOCUMENTS

| | | | |
|---|---|---|---|
| 3,950,707 A | * 4/1976 | Hill et al. ..................... 359/1 |
| 4,146,298 A | * 3/1979 | Szczepanek ................ 385/28 |
| 5,034,627 A | 7/1991 | Ayral et al. |
| 5,097,478 A | 3/1992 | Verdiell et al. |
| 5,121,400 A | 6/1992 | Verdiell et al. |
| 5,123,025 A | 6/1992 | Papuchon et al. |
| 5,222,093 A | 6/1993 | Pocholle et al. |
| 5,375,131 A | 12/1994 | Pocholle et al. |
| 5,394,412 A | 2/1995 | Huignard et al. |
| 5,581,010 A | * 12/1996 | Cunningham et al. ...... 558/290 |
| 5,818,614 A | 10/1998 | Nicolas et al. |
| 5,818,630 A | * 10/1998 | Fermann et al. ............ 359/341 |
| 5,887,009 A | * 3/1999 | Mandella et al. ............. 372/6 |
| 5,933,271 A | * 8/1999 | Waarts et al. ............... 359/341 |
| 5,994,687 A | 11/1999 | Chanteloup et al. |

FOREIGN PATENT DOCUMENTS

EP       0 980 122       2/2000

OTHER PUBLICATIONS

Bourderionnet J et al; Spatial mode control of a diode–pumped Nd:YAG laser using an intracavity holographic phase plate; Conference On Lasers And Electro–Optics (CLEO 2000); San Francisco, CA, USA; May 7–May 12, 2000, pp. 403–404.*

A. Brignon et al.: "Multimode to single–mode conversion of a Yb–doped fiber amplifier with a photorefractive Rh:BaTiO/sub3/ crystal" Applied Physics B (Lasers and Optics), vol. B72, No. 6, pp. 789–791 05/01.

J. Bourderionnet et al.: "Spatial mode control of a diode–pumped Nd:YAG laser using an intracavity holographic phase plate" Conference on Lasers and Electro–Optics (CLEO 2000); San Francisco, CA, USA, pp. 403–404 May 7, 2000–May 12, 2000.

* cited by examiner

Primary Examiner—Don Wong
Assistant Examiner—Leith Al-Nazer
(74) Attorney, Agent, or Firm—Oblon, Spivak, McClelland, Maier & Neustadt, P.C.

(57) ABSTRACT

A pumped-fiber laser comprising a multimode doped fiber (1) and a holographic spatial mode conversion device (3).

11 Claims, 4 Drawing Sheets

POWER FIBER LASER WITH MODE CONVERSION

BACKGROUND OF THE INVENTION

1. Field of the Invention

The invention relates to power laser sources based on a pumped doped fiber whose core is multimode. Usually the fiber receives a beam emitted by a monomode oscillator. The continuous or pulsed beam output by the fiber is therefore an amplified beam, but its power remains limited. The invention is designed to produce compact and efficient fiber sources delivering a high-power beam with good beam quality.

2. Background Art

The production of laser sources delivering power greater than 1 kW has been demonstrated at the present time in several laboratories using diode-pumped Nd:YAG rods.

Two types of architecture result in such performance: single oscillator and "MOPA" configuration, consisting of an oscillator, an amplifier and possibly a phase conjugation mirror. The object of the invention is to propose a diode-pumped fiber source architecture of the MOPA type. Continuous power greater than 100 W can be obtained using quasi-monomode fibers. Taking these results into account, we propose to produce sources delivering more than 1 kW of power using multimode fibers, the volume of the gain medium of which is very much greater than that of a monomode fiber.

BRIEF SUMMARY OF THE INVENTION

The invention therefore relates to a pumped fiber laser comprising a monomode laser oscillator transmitting a monomode laser beam to a first end of a doped fiber, characterized in that the doped fiber is multimode and in that it also includes a spatial mode conversion device receiving the beam. To guarantee diffraction-limited beam quality, a mode conversion device is introduced, which consists of a nonlinear medium serving to record a dynamic hologram or possibly a fixed (volume) hologram.

BRIEF DESCRIPTION OF THE DRAWINGS

The various objects and features of the invention will become more clearly apparent from the following description given by way of example and from the figures which show.

DETAILED DESCRIPTION OF THE INVENTION

Figure 1A:
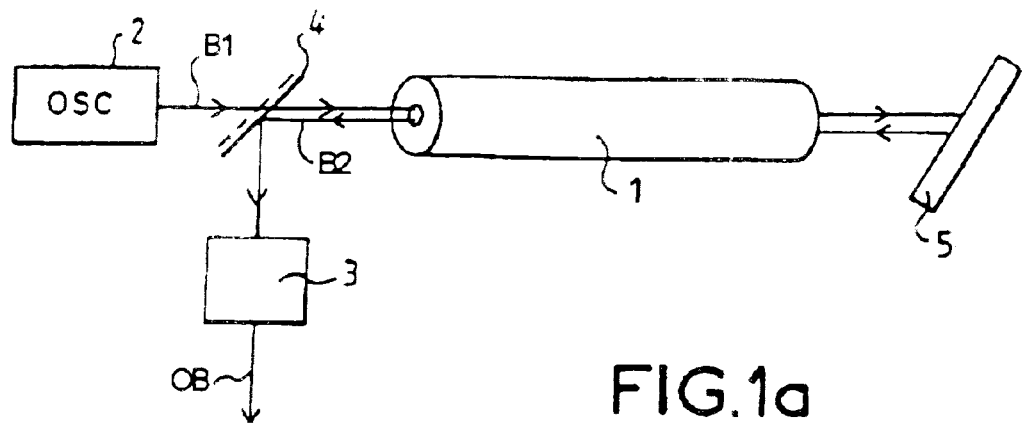
FIGS. 1a to 1c shows three embodiments of the invention.

FIG. 1a shows a simplified example embodiment of the invention. In this example embodiment, the fiber is self-pumped. It comprises a multimode optical fiber whose core is doped so as to have an active medium. The diameter of this core is preferably greater than 20 um or even greater than 50 um. It may even be envisaged to have fibers whose core diameter is greater than 80 Am. The optical fiber receives a laser beam coming from an oscillator 2. This laser beam is monomode. The laser beam travels along the optical fiber and is reflected by the phase conjugation mirror 5, which reflects a beam self-pumping the fiber 1. A laser beam is emitted by the fiber toward the semitransparent mirror 4 or a polarization splitter which reflects the light energy received from the fiber 1 onto a mode conversion device 3.

This mode conversion device is produced in a nonlinear material in which a volume hologram has been recorded and which will be explained later.

Thus, since the fiber 1 is multimode and very large in diameter compared with the fibers normally used in this type of laser, the beam emitted toward the device 3 is multimode —more specifically this beam is the superposition of a multitude of plane waves of random amplitude and random phase. Under these conditions, using a fiber which is thus multimode, a relatively powerful beam is emitted and, with the aid of the mode converter 3, an output beam OB is emitted which is of optical quality such that the beam OB is monomode.

Figure 1B:
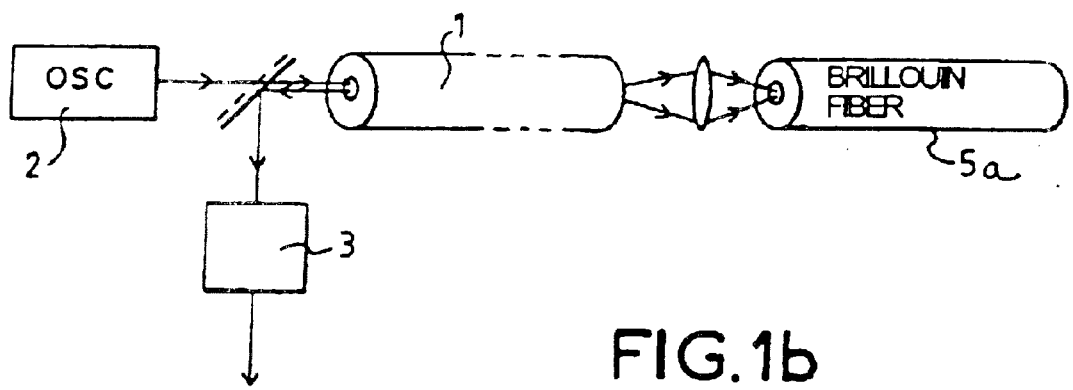

FIG. 1b is an alternative embodiment of the device shown in FIG. 1, in which the phase conjugation mirror 5 has been replaced with a fiber 5a of the Brillouin fiber type. This Brillouin fiber is of the type described in French patent No. 2 669 441 filed on Nov. 16, 1990.

Figure 1C:
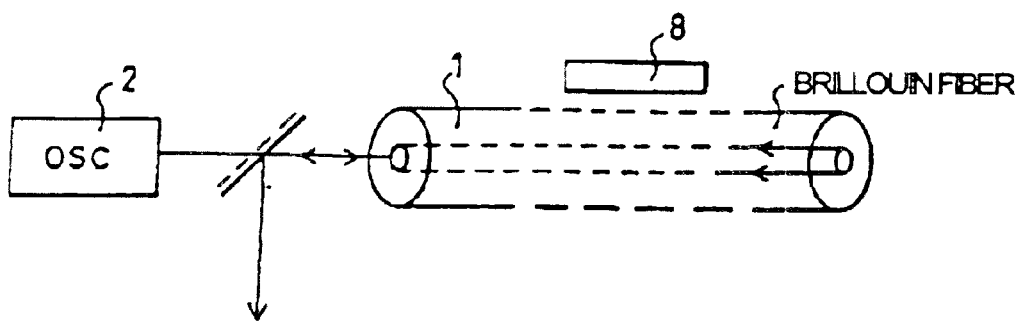

FIG. 1c is another alternative embodiment of the device shown in FIG. 1a, in which the multimode fiber 1 is a Brillouin fiber.

Figure 2:
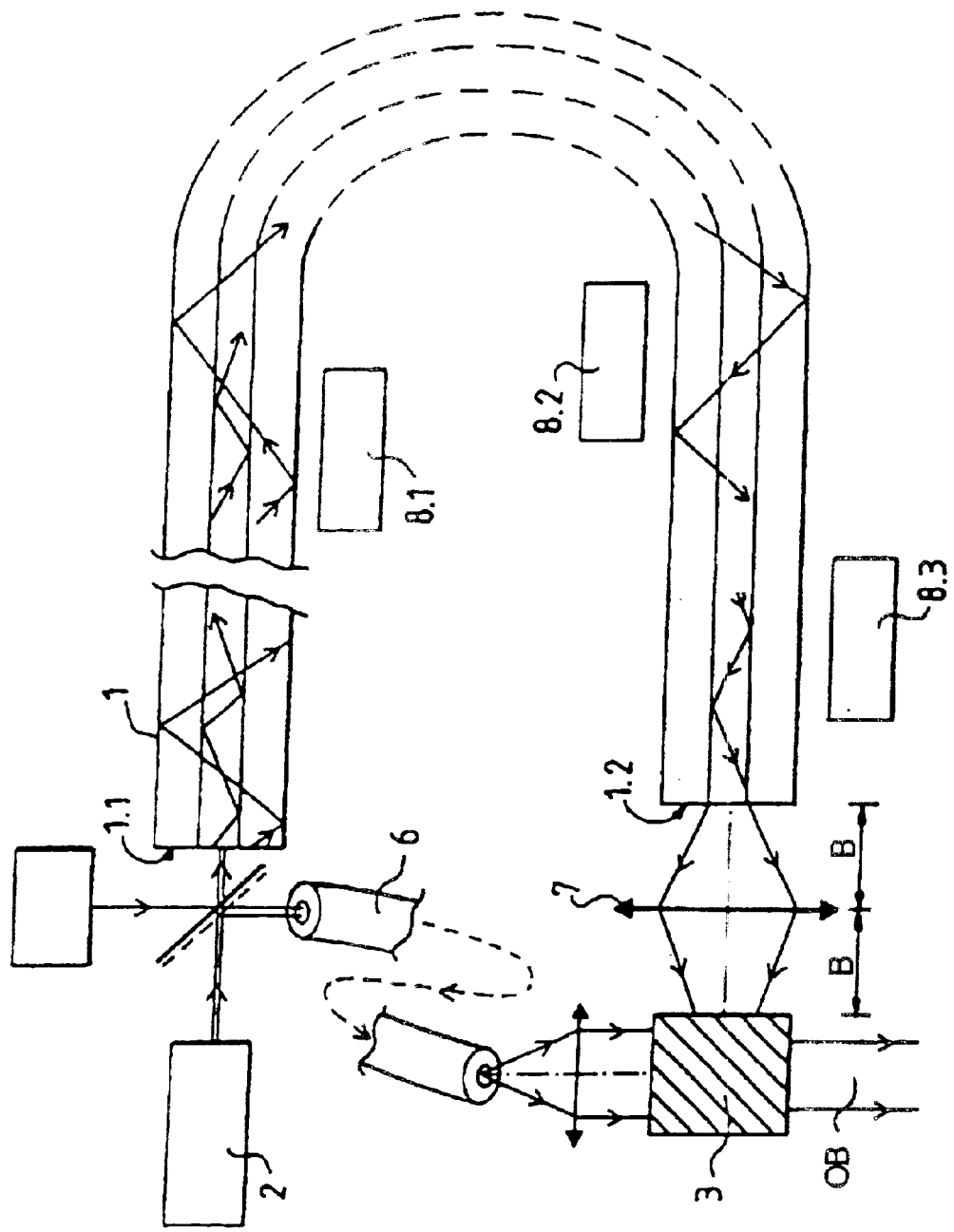
FIG. 2 shows an embodiment of the invention with a holographic medium used for mode conversion.

The device shown schematically in FIG. 2 incorporates the following elements:

a monomode laser oscillator 2;
a fiber amplifier 1;
a holographic medium 3 for mode conversion.

According to the embodiment in FIG. 2, the first end 1.1 of the fiber 1 receives the monomode beam emitted by the laser oscillator 2. The second end 1.2 of the fiber allows this beam, after being amplified in the fiber, to be transmitted toward the holographic medium 3. The latter also receives a portion of the monomode beam delivered by the laser oscillator 2. The two beams interfere in the holographic medium and, as will be explained below, this results in the energy of the amplified beam output by the fiber being transferred into the monomode beam delivered by the laser oscillator 2.

The oscillator 2 consists of a monomode low-power (>1 W) source: the source is monofrequency, with a certain coherence length and with diffraction-limited spatial beam quality. By way of example, this is a diode-pumped conventional oscillator or a fiber laser.

The multimode amplifier is therefore a fiber 1, the pumping of which is provided by power diodes 8.1, 8.2, ... 8.3, in a longitudinal or transverse configuration. The core of the fiber has a diameter, for example, of 100 μm. According to the conventional technique, the fiber core, which constitutes the gain medium, is pumped by total reflection of the pump wave at the cladding interface inside the fiber.

The mode conversion device 3 consists of a variable-index nonlinear medium. The low-power beam B1 output by the oscillator and the multimode beam B2 output by the fiber amplifier interfere in the volume of this medium. The two beams B1 and B2 are transmitted to the mode conversion device 3 via a monomode fiber 6. It is known that the two-wave type of interaction in the conversion device allows all the energy of the intense multimode beam B2 to be transferred into the monomode beam B1 provided that the two-wave gain coefficient of the material is high enough. This interaction with the beam clean-up function has been demonstrated with the following nonlinear mechanisms: photorefractive crystals of $LiNbO_3$, $BaTiO_3$, SBN, etc.; thermal nonlinearities: dyes, liquid crystals, etc.; Brillouin effect in multimode fibers.

The device in FIG. 2 allows the intense beam B2 to be completely depleted to the benefit of amplification of the monomode beam B1. If the hologram is a dynamic hologram, the material adapts to the slow variations in the pattern of interference between the beam delivered by the fiber 1 and the beam delivered by the laser oscillator 2.

Figure 3:
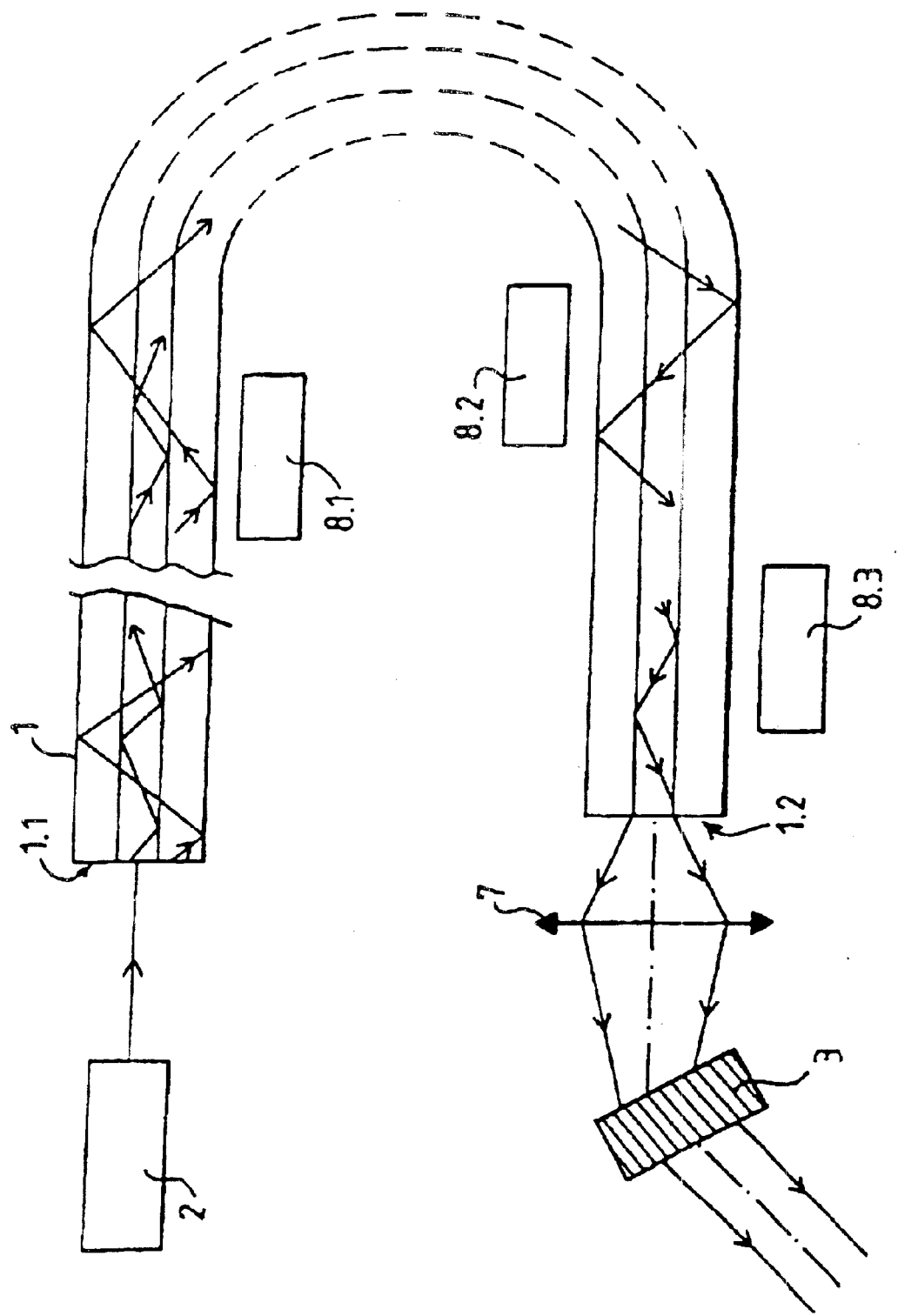
FIG. 3 shows an alternative version of the device shown in FIG. 2.

The mode conversion device may also be made from a fixed holographic component, for example a photorefractive crystal followed by a procedure of fixing the photoinduced grating, or by a hologram recorded in the volume of a photopolymer material. In this case, since the component is fixed, it no longer adapts to the change in the interference pattern. The mode conversion is effective only if the relative phase between the various modes radiated by the fiber remains fixed. This configuration does not require a reference beam for read-out. The system therefore is as shown in FIG. 3. The end 1.2 of the fiber 1 is coupled via the lens 7 to the mode conversion device 3. The combination of the fiber end 1.2, the Fourier lens and the holographic mode conversion component then constitutes a compact structure.

As an example, a source having a continuous power of greater than 1 kW emitting at $X=1.053$ $\mu$m may be achieved under the following conditions:

1 W Yb-fiber oscillator, 30 dB gain amplifier;

mode conversion by Rh-doped or $LiNbO_3$-doped $BaTiO_3$ crystal sensitized to $\lambda=1.053$ $\mu$m;

pumping power: 2 to 2.5 kW.

The reference beam delivered by the laser oscillator 2 is transmitted via a monomode fiber 6, the length of which is equal to that of the amplifying fiber 1. This condition relaxes the constraint on the coherence length of the oscillator.

The device of the invention allows a high power to be extracted from a multimode fiber amplifier. Under these conditions, all the associated nonlinear effects (Brillouin, Raman, etc.) are reduced since the emitted power density remains less than the damaged threshold of the interface.

A mode conversion device ensures coherent transfer of the energy emitted in a spatial mode with diffraction-limited quality.

Figure 4A:
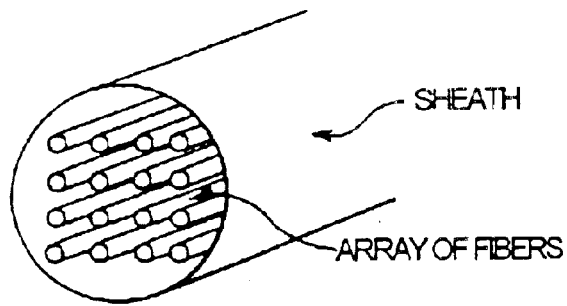
FIGS. 4a and 4b show embodiments in which the multimode fiber comprises a multitude of doped cores.
Figure 4B:
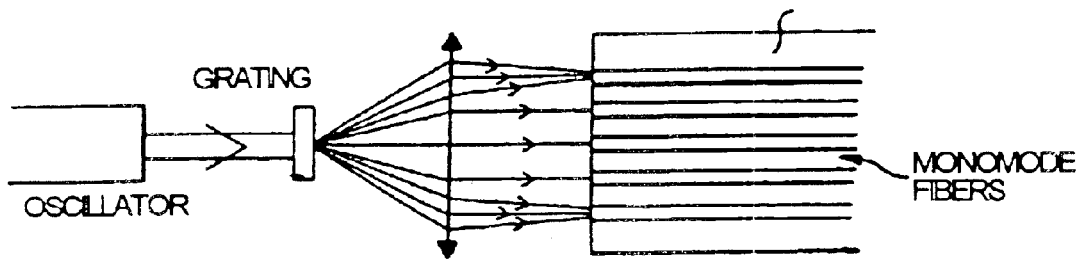

The device proposed also carries out mode conversion if the amplifying fiber consists of an ordered or disordered assembly of monomode fiber cores, as shown in FIGS. 4a and 4b.

Injection by the oscillator into an ordered array of monomode fiber cores takes place via a multiple-wave grating.

Figure 5:
FIG. 5 shows an alternative embodiment of the invention comprising a combination of multimode fiber and a spatial mode conversion device.

As shown in FIG. 5, the combination of multimode fiber and a spatial mode conversion device may constitute an oscillator emitting a monomode beam. In this case, the fiber 1 pumped by one or more diodes 8 and the mode converter are placed in an optical cavity 9, 10.

It should be noted that the fiber may be a polarization-maintaining fiber. Otherwise, the mode converter must be able to handle both polarization components.

Finally, the laser may operate in continuous mode or pulsed mode.

What is claimed is:

1. A pumped fiber laser, comprising:
   a multimode doped fiber (1) having a first end and a second end;
   a holographic spatial mode conversion means (3) configured to receive light from the multimode doped fiber;
   a monomode laser oscillator (2) configured to transmit a monomode laser beam to the first end of said multimode doped fiber; and
   an optical splitter (4) placed between the monomode laser oscillator (2) and the first end of the multimode doped fiber (1), and configured to transmit part of the monomode laser beam toward the multimode doped fiber and a reflected part of the monomode laser beam toward the hologaphic mode conversion device (3) so that the energy is transferred from the reflected monomode laser beam to the part of the monomode laser beam coming from the splitter such that the mode conversion device transmits a monomode amplified beam.

2. The laser as claimed in claim 1, wherein the multimode doped fiber comprises:
   a core with a diameter larger than 30 micrometers.

3. The laser as claimed in claim 1, further comprising:
   a phase conjugation reflection device (5) coupled to the second end of the multimode doped fiber (1) and configured to reflect said monomode laser beam.

4. The laser as claimed in claim 1, further comprising:
   at least one pumping light source configured to transmit a corresponding at least one pumping beam to the multimode doped fiber.

5. The laser as claimed in claim 4, wherein the holographic mode conversion device (3) comprises:
   a prerecorded mode conversion device configured to convert the reflected laser beam into a monomode beam.

6. The laser as claimed in claim 1, wherein said multimode doped fiber comprises:
   a plurality of doped cores.

7. The laser of claim 1, wherein said holographic spatial mode conversion means comprises one of:
   a variable index nonlinear medium including a recorded volume hologram; and
   a fixed holographic component, including one of a photorefractive crystal with a fixed photoinduced grating and a hologram recorded in a volume of a photopolymer material.

8. The laser of claim 1, further comprising:
   an optical cavity configured to contain said pumped-fiber laser such that said holographic spatial mode conversion means is arranged in series with said optical cavity.

9. A laser device, comprising:
   an optical cavity;
   a pumped-fiber laser contained within said optical cavity; and
   a spatial mode conversion means in series with said optical cavity, said spatial mode conversion means configured to convert a multimode beam into a monomode beam.

10. The laser device of claim 9, said pumped-fiber laser comprising:
    a multimode fiber having a core diameter greater than 30 micrometers.

11. The laser device of claim 9, wherein said spatial mode conversion means comprises one of:
    a variable index nonlinear medium including a recorded volume hologram; and
    a fixed holographic component, including one of a photorefractive crystal with a fixed photoinduced grating and a hologram recorded in a volume of a photopolymer material.

* * * * *